A multi-purpose retainer is provided for use in association with a drive mechanism for retaining a housing thereof to a support. The mechanism has a nut disposed therein which is accessible through an opening formed in the housing. The retainer has a body portion positionable across the opening for serving as a cover therefor and nut locking device provided on the body portion and extendable into the opening. The retainer is securable in any of a plurality of angular positions relative to the nut to permit the placement of the nut locking device in constraining relation thereabout to lock the nut in substantially any desired rotational position so as to prevent its inadvertent loosening during operation.

United States Patent [19]

Dauwalder

[11] 3,999,815
[45] Dec. 28, 1976

[54] MULTI-PURPOSE RETAINER FOR DRIVE MECHANISMS
[75] Inventor: Fred R. Dauwalder, Aurora, Ill.
[73] Assignee: Caterpillar Tractor Co., Peoria, Ill.
[22] Filed: Sept. 19, 1975
[21] Appl. No.: 615,021
[52] U.S. Cl. .................. 308/207 R; 180/9.2 R; 295/36 R
[51] Int. Cl.² .................. F16C 27/04; F16C 35/00
[58] Field of Search .............. 308/187, 187.1, 202, 308/207 R; 295/36 R; 180/9.1

[56] References Cited
UNITED STATES PATENTS
2,453,360  11/1948  Burks ..................... 180/9.1

Primary Examiner—Joseph F. Peters
Assistant Examiner—Richard A. Bertsch
Attorney, Agent, or Firm—Ralph E. Walters

[57] ABSTRACT

7 Claims, 2 Drawing Figures

U.S. Patent   Dec. 28, 1976   3,999,815

MULTI-PURPOSE RETAINER FOR DRIVE MECHANISMS

BACKGROUND OF THE INVENTION

This invention relates generally to vehicle drive mechanisms and the like and more particularly to a multi-purpose retainer for use therewith.

Drive mechanisms, such as final drive assemblies for crawler tractors and the like, have in the past employed bearing assemblies to rotatably mount their track engaging sprockets about a nonrotatable sprocket shaft. A nut is sometimes mounted on the end of the sprocket shaft to secure such bearing assemblies and sometimes permit the adjustment of bearing preload. To prevent the nut from turning during operation, a cotter pin or, on large tractors, a lock plate having a shaped opening to engage the peripheral faces of the nut has been employed.

Again in present day large tractors, the final drive assemblies are secured to their respective track frames of such tractors in a manner which substantially prevents any lateral movement therebetween, but may permit a limited amount of oscillation between the track frame and the sprocket shaft. Typically, this is accomplished by a split-type support collar bolted or otherwise secured to the track frame which, in turn, may be fitted into a peripheral groove provided about an outer housing or bracket of the final drive assemblies.

To permit access to the nut, an access opening may be provided through such housing. Separate covers are sometimes used to cover such openings to prevent the loss of lubricant which may be carried in the final drive assemblies and to prevent the ingress of foreign material into the housing.

Thus, the prior art has provided separate devices to retain the outer bracket in the support collar, to lock the nut on the end of the sprocket shaft against rotation, and to cover the access opening to the nut. It is desirable to provide a single apparatus which can perform two or more of these functions.

OBJECTS OF THE INVENTION

Accordingly, it is an object of this invention to provide a multi-purpose retainer for retaining a housing to a support, which retainer also functions both as a lock for a nut disposed within the housing and as a cover for closing an opening in the housing permitting access to such nut.

Another object of this invention is to provide such multi-purpose retainer which reduces the number of components and the complexity of the mechanism in which it is employed while being, itself, simple in construction and inexpensive to manufacture.

Another object of this invention is to provide a multi-purpose retainer which is securable in any of a plurality of angular positions to enable the locking of a nut in substantially any desired rotational position.

DETAILED DESCRIPTION OF THE PREFERRED EMBODIMENT

Figure 1:
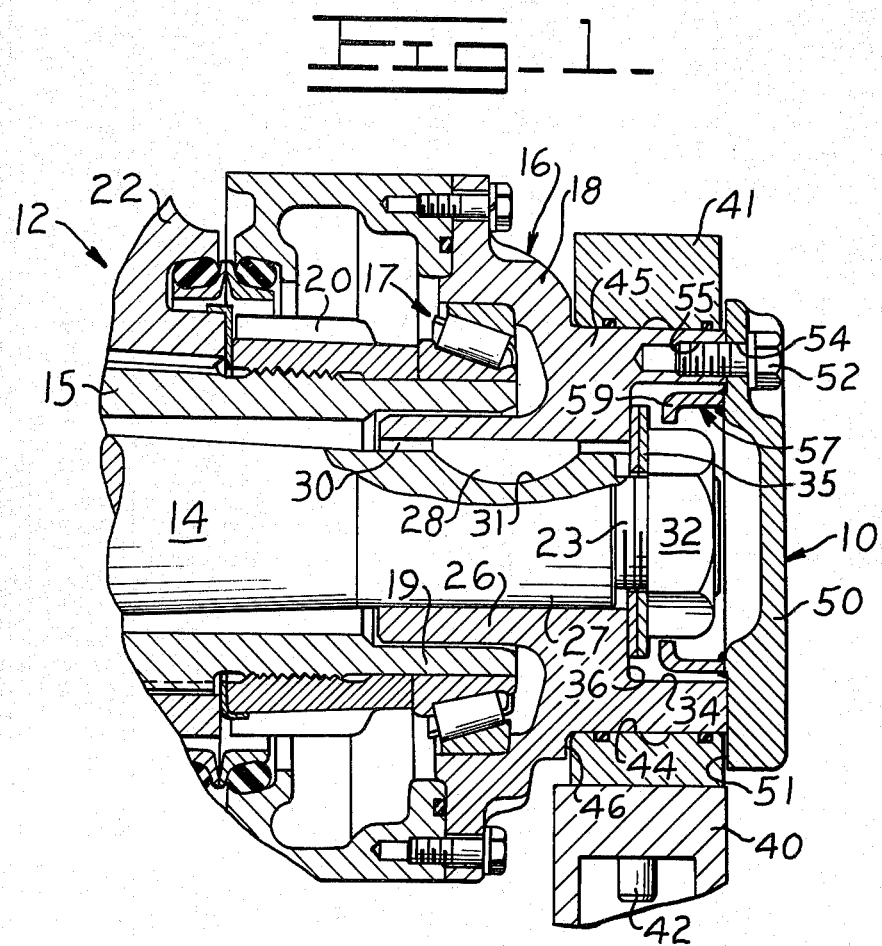
FIG. 1 is a fragmentary transverse sectional view of an outer end portion of a drive mechanism in which a multi-purpose retainer embodying the principles of the present invention is employed.

Referring more particularly to the drawings, a multi-purpose retainer is generally indicated at 10 in FIG. 1 and is mounted in an operative position to a drive mechanism, such as a final drive assembly, partially shown at 12, of a crawler tractor, not shown.

The final drive assembly 12, which will be understood is depicted herein merely as a way of illustration, includes a nonrotatable sprocket shaft 14 about which a sprocket carrying hub 15 is rotatably mounted by a pair of bearing assemblies, the outer one of which is shown at 16. The bearing assembly 16 includes a tapered roller bearing 17 and mounting structure, such as housing or bearing cage 18. The bearing is carried on an outer end 19 of the hub 15 in axial abutting engagement against a lock nut 20 for securing a drive sprocket, partially shown at 22, onto the hub.

The bearing cage 18 is used for supporting the bearing 17 on the distal end 23 of the shaft. In particular, the bearing cage 18 has an inner sleeve portion 26 which is slidably mounted on a cylindrical portion 27 provided on the shaft adjacent its distal end 23. Thus, relative axial movement between the bearing cage and shaft is provided so as to permit adjustment of bearing preload, as hereinafter described. Relative rotation between the shaft and the bearing cage is prevented by a key 28 mounted in suitable grooves 30 and 31 in the bearing cage and the shaft, respectively.

The bearing cage 18 is secured and the preload of the bearing 17 is adjusted by a nut 32 screw threadably mounted on the distal end 23 of the shaft. Such nut is disposed within an open recess 34 provided in the bearing cage so as to permit access thereto. The nut 32 reacts through a pair of washers 35 against a shoulder 36 provided at the bottom of the recess for exerting an axial force on the bearing cage 18.

The final drive assembly 12 is mounted to a track frame, partially shown at 40, of the tractor by an outer support 41 which is secured to the frame in any suitable manner, such as by dowels 42. The outer support is provided with a bore 44 for receiving an outer cylindrical end portion 45 of the bearing cage 18. The bearing cage is provided with a radially extending shoulder 46 adjacent one side of the support 41.

The multi-purpose retainer 10 of the present invention includes a generally circular body portion 50 of a size greater than the cylindrical outer end portion 45 of the bearing cage to define a radially extending shoulder 51 positionable adjacent the other side of the support 41. Thus, the support is substantially fixed in axial relation relative to the final drive assembly between the shoulders 46 and 51 of the bearing cage and the retainer, respectively, when the retainer is secured. Such retainer is securable to the bearing cage 18 in a manner to permit the positioning of the retainer in any of a plurality of angular positions relative to the nut 32, as will hereinafter be more fully understood. As shown in the present embodiment, the retainer is preferably secured by a plurality of bolts, one of which is shown at 52, which are disposed through a similar number of apertures 54 in the body portion 50. The bolts are screw threadably engageable in suitable threaded apertures 55 provided in the end face 56 of the outer end portion 45 of the bearing cage against which the body portion 50 is positionable.

Figure 2:
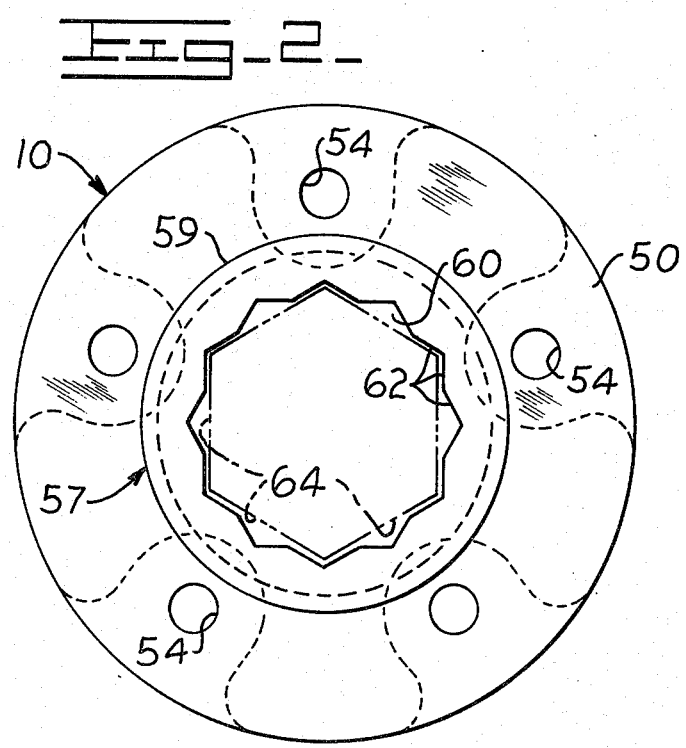
FIG. 2 is an elevational view of the inside of the retainer, as it would appear alone when removed from the drive mechanism.

In particular, as best shown in FIG. 2, a 5-bolt pattern is preferably used, as indicated by the five equally circumferentially spaced apertures 54 therein.

The retainer extends fully across the open recess 34 so as to serve as a cover therefore to prevent the loss of lubricant normally found in final drive assemblies of the type described and to prevent the ingress of foreign material thereinto. In this regards, a liquid sealing compound or gasket, not shown, may be used between the retainer and the abutting end face 56 of the bearing cage 18.

The retainer 10 also includes a nut locking device or tubular socket 57 extending outwardly from the inside face of the body portion 50 into the recess 34. The socket is adapted to be fitted in constraining engagement about the nut 32 so as to prevent its inadvertent loosening during subsequent operation. In particular, the locking device is in the form of a cup-shaped member 59 which is preferably secured in an inverted fashion to the inside surface of the body portion by inertia welding. A shaped opening 60, as best shown in FIG. 2, is provided in the base of the cup member for providing a plurality of nut engaging surfaces 62 for engagement with a plurality of peripheral faces 64 provided about the nut. In the present embodiment, the nut is hexagonally shaped, as shown in phantom lines in FIG. 2, defining use of such peripheral faces. The shaped opening 60 is preferably a 12 point, double hexagon pattern as shown.

The combination of the 5-bolt pattern for securing the retainer to the bearing cage and the 12 point, double hexagon pattern of the locking device, which are understood to have their central axes concentric to the nut 32, permit the positioning of the retainer within 3° of any rotational position which the nut may assume. In addition, the normal nominal clearance commonly provided between the faces of nut and the nut engaging surfaces of the socket permits further angular adjustment such that, in practice, the retainer can accommodate substantially any rotational position of the nut.

Thus, as is readily apparent from the foregoing, the particular construction of the present multi-purpose retainer 10 cooperatively serves with the shoulder 46 for retaining the bearing cage 18 within the support 41, provides a cover for covering the open recess 34 permitting access to the nut 32, and further serves to lock the nut 32 in any desired rotational position so as to prevent its inadvertent loosening during operation.

While the present invention has been described and shown with particular reference to the preferred embodiment, it will be apparent that variations might be possible that would fall within the scope of the present invention, which is not intended to be limited except as defined in the following claims.

What is claimed is:

1. A multi-purpose retainer for use in combination with a support and a housing, with the support having opposite sides and a bore formed transversely between said sides, and with the housing having a cylindrical end portion journalled in the bore of the support and a radially extending shoulder engageable against one of said sides of the support, said housing including a nut mounted therewithin and an opening for providing access to said nut, wherein the improvement comprises:

a circular shaped body portion positioned across said opening of the housing to provide a cover therefore, said body portion being sized greater than said cylindrical end portion of the housing to provide a radially extending shoulder for engagement against the other of said side of the support so that the support is constrained between said shoulders;

nut locking means provided on said body portion and extendable into said opening of the housing; and means for detachably fastening said body portion to said housing in any of a plurality of annular positions relative to said nut to permit the placement of said nut locking means in a position of constraining engagement about said nut so as to prevent the inadvertent loosening of the nut during operation.

2. The multi-purpose retainer of claim 1 in which said housing is a bearing cage for a final drive assembly, which assembly includes a nonrotatable sprocket shaft having a distal end, and wherein said nut is screw threadably mounted on said distal end of said sprocket shaft for securing the bearing cage thereon.

3. The retainer of claim 2 wherein said bearing cage has an open recess therein in which said nut is disposed and which defines said opening providing access to the nut, and wherein said nut locking means includes a tubular socket portion extending outwardly from said body portion of said retainer into said recess for locking engagement against the peripheral faces of said nut.

4. The retainer of claim 3 wherein said nut is hexagonally shaped defining six peripheral faces thereabout and said socket portion has a 12 point, double hexagonal configuration for engaging said nut at any of 12 angular positions.

5. The retainer of claim 4 wherein said fastening means includes 5 bolts arranged in equally circumferentially spaced positions through said body portion into screw threaded engagement with a like number of threaded apertures provided in said bearing cage, which, in cooperation with said 12 point, double hexagon configuration of said socket, permits the securing of said retainer within a maximum of 3° of any desired rotational position of said nut.

6. The retainer of claim 5 wherein said socket is a generally cupped member having a shaped opening provided in the base thereof defining said 12 point, double hexagon configuration.

7. The retainer of claim 6 wherein said cupped shaped member is secured to said body portion by inertia welding.

* * * * *